United States Patent
Kovvali et al.

(10) Patent No.: US 8,085,810 B2
(45) Date of Patent: Dec. 27, 2011

(54) CROSS-LAYER PIPELINING OPTIMIZATIONS FOR REDUCED ROUNDTRIPS AND IMPROVING QUALITY OF EXPERIENCE

(75) Inventors: Surya Kumar Kovvali, Westborough, MA (US); Ramji Raghavan, Winchester, MA (US)

(73) Assignee: Movik Networks, Westford, MA (US)

( * ) Notice: Subject to any disclaimer, the term of this patent is extended or adjusted under 35 U.S.C. 154(b) by 154 days.

(21) Appl. No.: 12/535,081

(22) Filed: Aug. 4, 2009

(65) Prior Publication Data

US 2010/0034218 A1    Feb. 11, 2010

Related U.S. Application Data

(60) Provisional application No. 61/086,513, filed on Aug. 6, 2008.

(51) Int. Cl.
*H04J 3/22* (2006.01)
(52) U.S. Cl. .................................. 370/466; 370/401
(58) Field of Classification Search .................... None
See application file for complete search history.

(56) References Cited

U.S. PATENT DOCUMENTS

| | | | | |
|---|---|---|---|---|
| 6,449,658 | B1 * | 9/2002 | Lafe et al. | 709/247 |
| 6,901,445 | B2 * | 5/2005 | McCanne et al. | 709/225 |
| 7,120,666 | B2 * | 10/2006 | McCanne et al. | 709/203 |
| 7,428,573 | B2 * | 9/2008 | McCanne et al. | 709/203 |
| 7,716,307 | B1 * | 5/2010 | Ben-Shaul et al. | 709/219 |
| 7,849,134 | B2 * | 12/2010 | McCanne et al. | 709/203 |
| 2002/0059379 | A1 | 5/2002 | Harvey et al. | |
| 2004/0088376 | A1 | 5/2004 | McCanne et al. | |
| 2004/0203763 | A1 | 10/2004 | Tammi | |
| 2004/0215746 | A1 * | 10/2004 | McCanne et al. | 709/219 |
| 2005/0021841 | A1 * | 1/2005 | Yoshimoto | 709/238 |
| 2005/0025047 | A1 * | 2/2005 | Bodin et al. | 370/229 |
| 2007/0244987 | A1 | 10/2007 | Pedersen et al. | |

OTHER PUBLICATIONS

3GPP TS 23.101 V7.0.0 (Jun. 2007); Technical Specification; "3rd Generation Partnership Project; Technical Specification Group Services and System Aspects General Universal Mobile Telecommunications system (UMITS) architecture" (Release 7).
3GPP TS 23.002 V7.2.0 (Jun. 2007); Technical Specification; "3rd Generation Partnership Project; Technical Specification Group Services and Systems Aspects; Network architecture" (Release 7).

(Continued)

*Primary Examiner* — Donald Mills
(74) *Attorney, Agent, or Firm* — Nields, Lemack & Frame, LLC

(57) ABSTRACT

Methods for pipelining, piggybacking, and transporting cross layer parameters through a network to reduce round-trip times are disclosed. Application activation, such as accessing a web-site through the internet, currently uses several protocols, including DNS Name resolution, establishing a TCP connection, sending HTTP Request and getting HTTP-Response that contains the web-page data, before the data from the web-site can be displayed to the user. Such operations take several round-trips through the transit network and are of the order of 100 to 200 milliseconds in the wireless access network in the best case. A method of generating a multi-part message to reduce these round trip is disclosed, as well as a proxy device which minimizes client side round trips while utilizing standard messaging in the wireline network. The invention includes client side user parameter gathering when specifying the application first (pre-fix), or specifying the application last (post-fix).

25 Claims, 8 Drawing Sheets

Inline Proxy configuration using the current invention

OTHER PUBLICATIONS

3GPP TS 25.410 V7.0.0(Mar. 2006); Technical Specification; "3rd Generation Partnership Project; Technical Specification Group Radio Acess Network; UTRAN Iu Interface: general aspects and principles" (Release 7).

3GPP TS 23.060 V7.4.0 (Mar. 2007); Technical Specification; "3rd Generation Partnership Project; Technical Specification Group Services and System Aspects; General Packet Radio Service (GPRS); Service description; Stage 2" (Release 7).

3GPP TS 36.401 V8.3.0 (Sep. 2008); Technical Specification; "3rd Generation Partnership Project; Technical Specification Group Radio Access Network; Evolved Universal Terrestrial Radio Access Network; (E-UTRAN); Architecture description" (Release 8).

"Performance of PEPs in Cellular Wireless Networks"; Pablo Rodrigues et al.; Microsoft Research , Cambridge, WCW' 03—Workshop on Web Content Caching and Distribution, New York, Sep. 2003.

"Performance of Different Proxy Concepts in UMTS Netowrks"; Marc C. Necker et al.; http://www.ikr.uni-stuttgart.de/Content/Publications/Archive/Ne_UMTSEuroNGI104_36375.pdf.

The International Search Report dated Oct. 2, 2009.

* cited by examiner

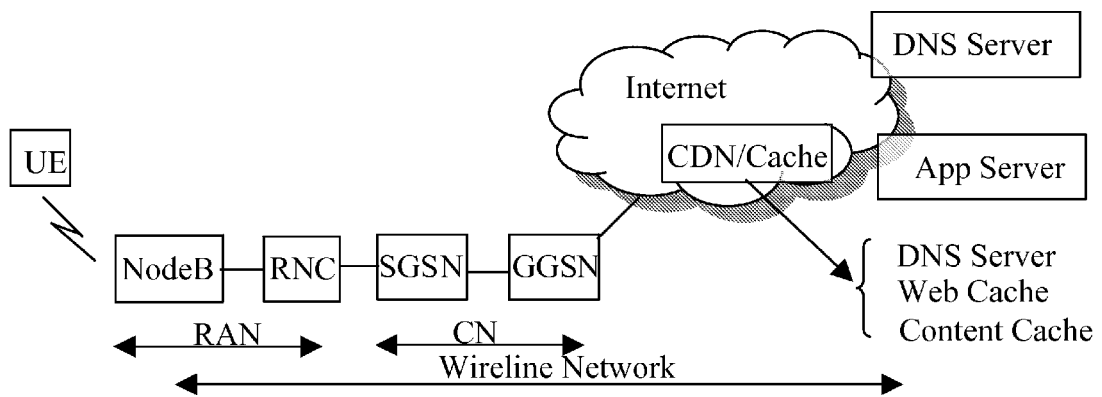
- UE– User Equipment –Handset or laptop
- NodeB – Base Transceiver Station
- RNC – Radio NetworkController
- SGSN – Serving GPRS Support Node
- GGSN – Gateway GPRS Support Node
PRIOR ART
Figure 1: Mobile Wireless Network Configuration

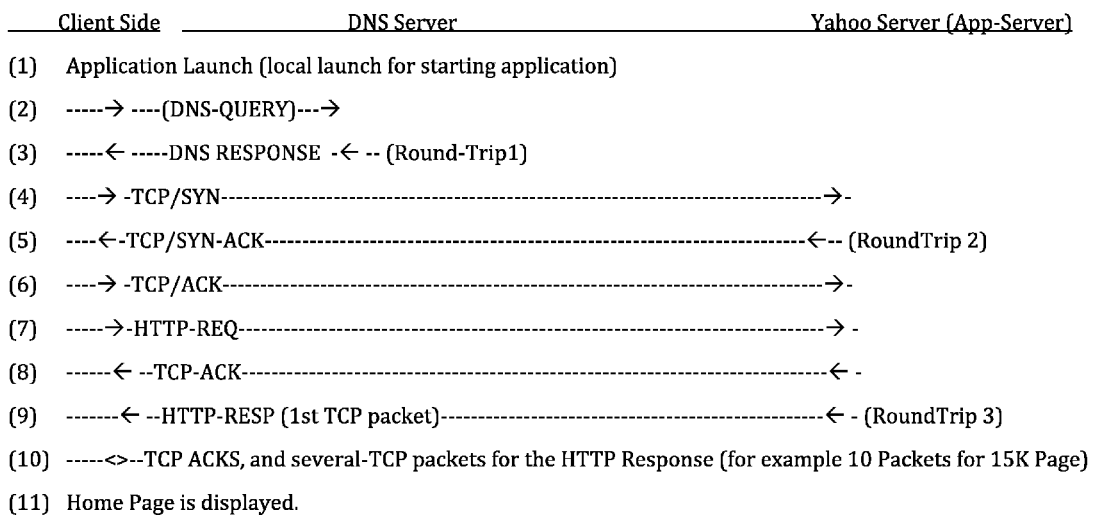
Figure 2: Protocol Sequence in the Prior Art Environment

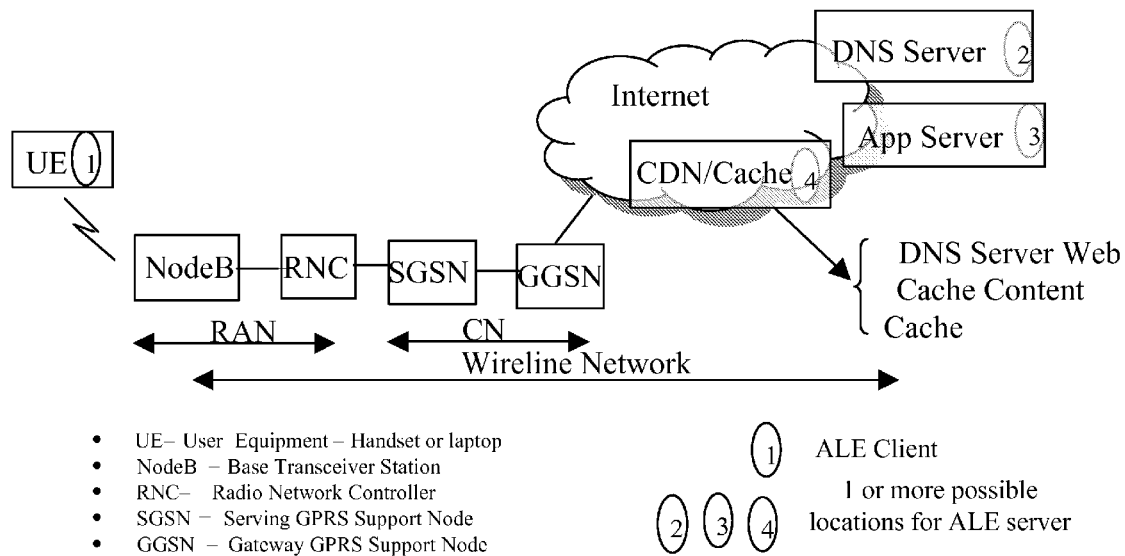
Figure 3: Configuration without inline Proxy

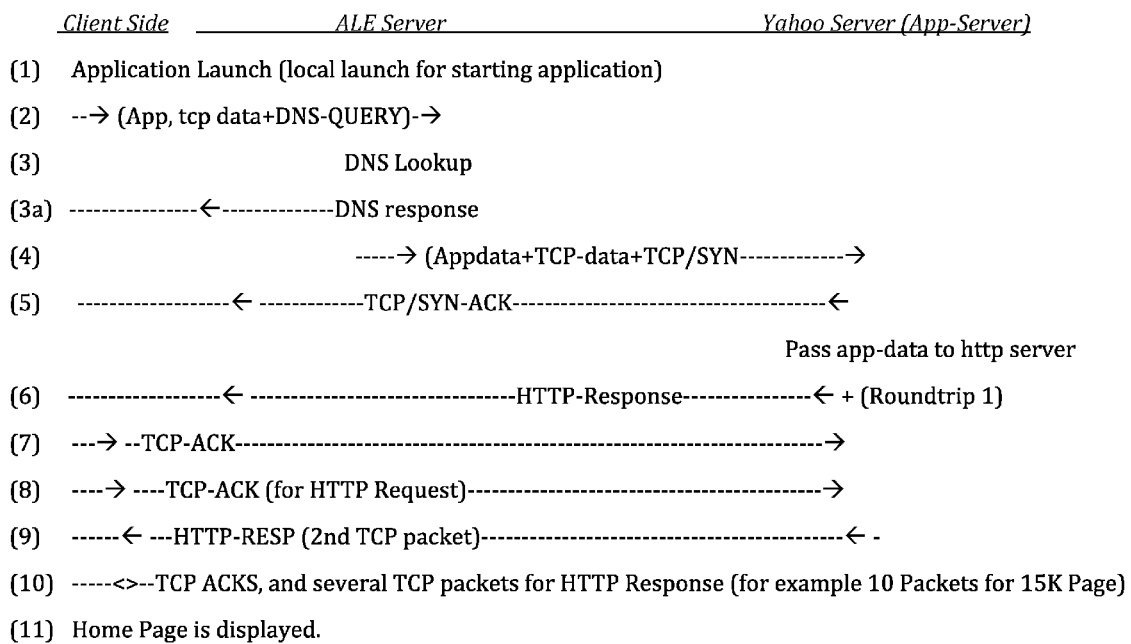

|  | Client Side | ALE Server | Yahoo Server (App-Server) |

(1) Application Launch (local launch for starting application)
(2) --→ (App, tcp data+DNS-QUERY)-→
(3)                                       DNS Lookup
(3a) ----------------←--------------DNS response
(4)                             -----→ (Appdata+TCP-data+TCP/SYN-------------→
(5) ------------------← -------------TCP/SYN-ACK-------------------------------------←
                                                                                                                                   Pass app-data to http server
(6) ------------------← --------------------------------HTTP-Response----------------← + (Roundtrip 1)
(7) ---→ --TCP-ACK-------------------------------------------------------------------→
(8) ----→ ----TCP-ACK (for HTTP Request)------------------------------------------→
(9) ------← ---HTTP-RESP (2nd TCP packet)-------------------------------------------← -
(10) -----<>--TCP ACKS, and several TCP packets for HTTP Response (for example 10 Packets for 15K Page)
(11) Home Page is displayed.

Figure 4a: Protocol Sequence per the present invention without a proxy

|  | *Client Side* | *ALE Server* | *Yahoo Server (App-Server)* |

(1) Application Launch (local launch for starting application)

(2) --→ (App, tcp data+DNS-QUERY)-→

(3)                          DNS Lookup (4)                               -----→ (Appdata+TCP-data+TCP/SYN-------------→

(5)                                                                                      Pass TCPdata to TCP, (6)                                                                                     App-data to http server ------------------← -------------TCP/SYN-ACK---HTTP-Response----------------← + (Roundtrip 1)

(7) ---→ --TCP-ACK-----------------------------------------------------------------→

(8) ----→ ----TCP-ACK (for HTTP Request)-------------------------------------→

(9) ------← ---HTTP-RESP (2nd TCP packet)---------------------------------------← -

(10) -----<>--TCP ACKS, and several TCP packets for HTTP Response (for example 10 Packets for 15K Page)

(11) Home Page is displayed.

Figure 4b: Protocol Sequence per the present invention without a proxy

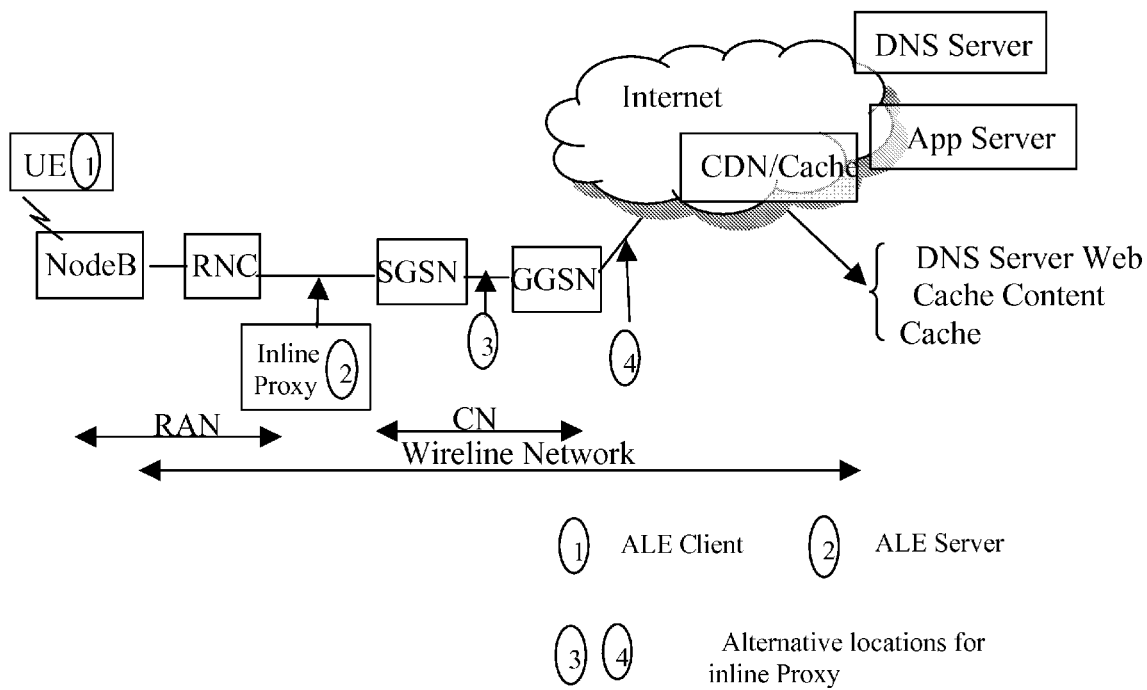
Figure 5: Inline Proxy configuration using the current invention

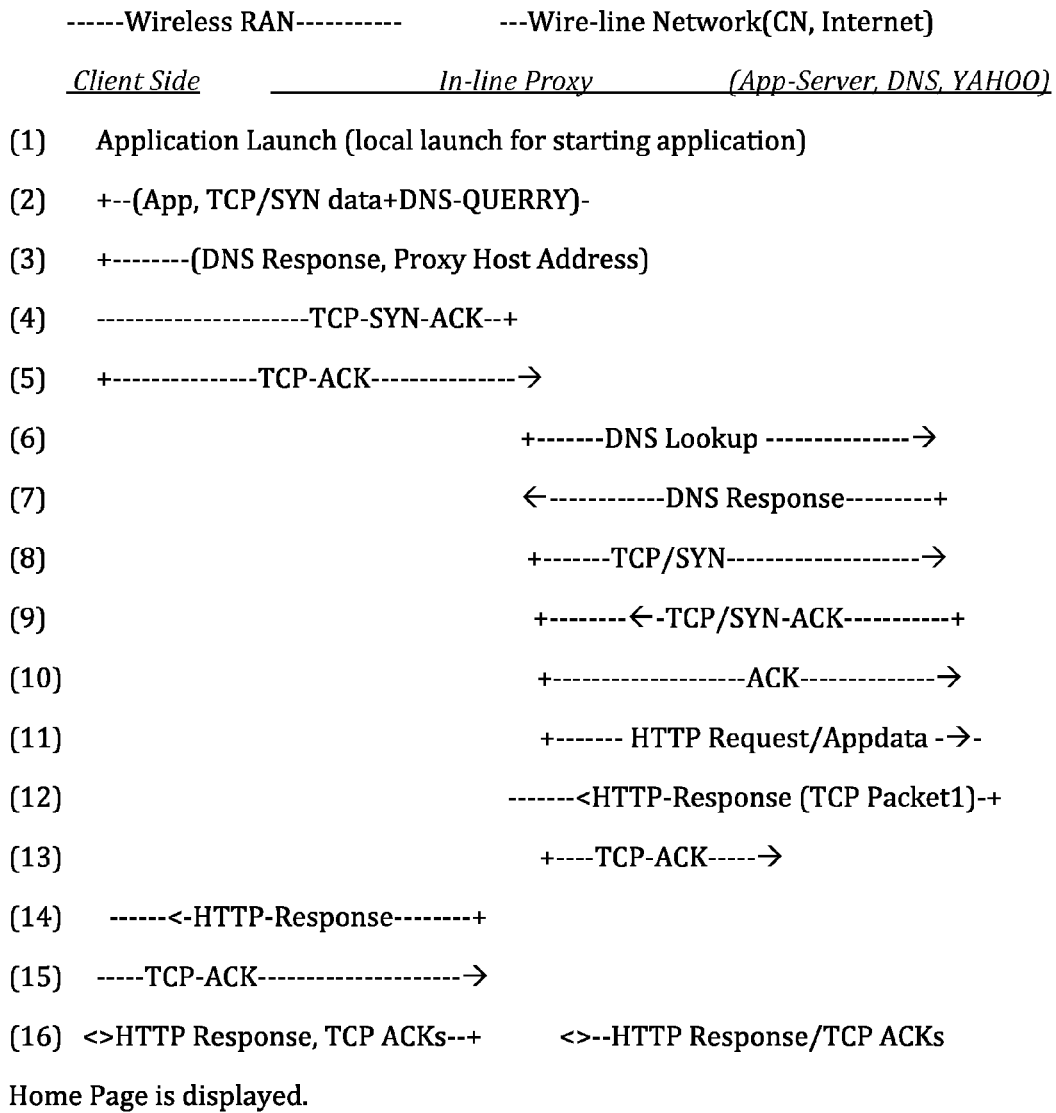
Figure 6: Protocol Sequence per the current invention with an in-line proxy

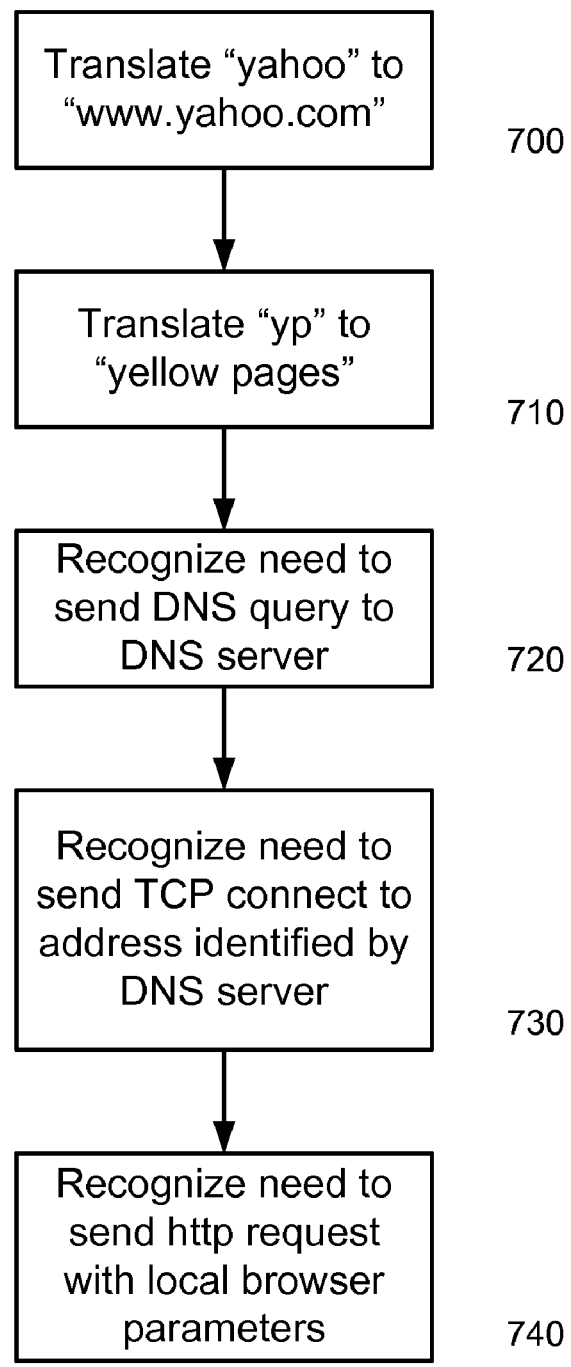
FIGURE 7: ALE Client Sequence

CROSS-LAYER PIPELINING OPTIMIZATIONS FOR REDUCED ROUNDTRIPS AND IMPROVING QUALITY OF EXPERIENCE

This application claims priority of U.S. Provisional Patent Application Ser. No. 61/086,513, filed Aug. 6, 2008, the contents of which are herein incorporated by reference in their entirety.

BACKGROUND OF THE INVENTION

FIG. 1 shows the network elements in an exemplary Mobile wireless network, for example, a 3G/UMTS network. The wireless network includes a Radio Access Network (RAN) and a Core Network (CN).

The GGSN (Gateway GPRS Service Node) connects the mobile wireless network to the IP Core Network. The Gateway GPRS Support Node (GGSN) is a main component of the GPRS (General Packet Radio Service) network. The GGSN is responsible for compatibility between the GPRS network and external packet switched networks, such as the Internet and X.25 networks.

When viewed from an external network, the GGSN appears as a router to a sub-network, because the GGSN hides the GPRS infrastructure from the external network. When the GGSN receives data addressed to a specific user, it checks if the user is active. If it is, the GGSN forwards the data to the SGSN serving the mobile user. However if the mobile user is inactive, the data are discarded, or a paging procedure is initiated to locate and notify the mobile device. For data originated within the GPRS network, the GGSN routes these mobile-originated packets to the correct external network.

The GGSN converts the GPRS packets coming from the SGSN into the appropriate packet data protocol (PDP) format (e.g., IP or X.25) and sends them out on the corresponding packet data network. For incoming packets, the PDP addresses are converted to the GSM (Global System for Mobile communications) address of the destination user. The readdressed packets are then sent to the responsible SGSN. In order to accomplish this function, the GGSN stores the current SGSN address of the user and its associated profile in its location register. The GGSN is responsible for IP address assignment and is the default router for the connected user equipment (UE). The GGSN also performs authentication functions.

A Serving GPRS Support Node (SGSN) is responsible for the delivery of data packets from and to the mobile stations within its geographical service area. Its tasks include packet routing and transfer, mobility management (attach/detach and location management), logical link management, and authentication and charging functions. The location register of the SGSN stores location information and user profiles of all GPRS users registered with this SGSN.

The Radio Network Controller (or RNC) is a governing element in the radio access network and is responsible for controlling the Node Bs that are connected to it. The RNC carries out radio resource management, some of the mobility management functions and is the point where encryption is done before user data is sent to and from the mobile. The RNC connects to the SGSN (Serving GPRS Support Node) in the Packet Switched Core Network.

Node B is a term used to denote the base transceiver station (BTS) in the UMTS/3GPP Architecture. As in all cellular systems, such as GSM, Node B (or BTS) contains radio frequency transmitter(s) and the receiver(s) used to communicate directly with the user equipment, which move freely around it.

The UE comprises all user equipment, including handsets, smart phones and computing equipment.

Regardless of the underlying physical transport medium, most Internet applications use Client-Server Architectures, where the Client and Server are two different applications (Layer 7) in two different devices that communicate through the Internet using TCP/IP protocols. The sequence of operations followed for a typical transaction is shown in FIG. 2.

While this example shows the accessing of a website, the sequence shown is applicable to many other applications as well. For example, when accessing an Internet site, such as yellow pages on www.yahoo.com, the user first starts the client application, as shown in step 1. In this example, the client application would preferably be a web-browser. The user then enters the domain name of the site he intends to access. The client device generates a DNS Query to the default DNS server, as shown in step 2, which then translates the domain name to an IP Address. In step 3, the DNS server returns the response that contains one or more IP addresses that correspond to the name of the intended site. The Client side, in step 4, then generates a TCP Connect (TCP/SYN) request to connect to Server's port number (for example HTTP Port) at the IP address contained in the DNS Response. The application server then returns an acknowledgement (TCP/SYN-ACK), as shown in step 5. The client responds with a TCP/ACK in step 6 and establishes a TCP connection. The client application (i.e. the browser) then sends an HTTP Request to the server, as shown in step 7. In step 9, the server returns an HTTP Response, which includes the Home Page of www.yahoo.com, which contains the link for yellow pages. The user then selects the yellow-pages link. Multiple TCP packets may be exchanged, depending on the size of the page being returned.

In the above sequence, there is a minimum of 3 Roundtrips for receiving the top page of the site, if the HTTP Response is contained in one TCP packet and many more TCP packets if the page is larger. Even if the web page content is contained in single TCP Packet (http-response), before the client-application sees any web-page content, a minimum of 3 round trips elapse. On marginal links, such as in wireless mobile environment, the "Over the Air Bandwidth" (OTA BW) and the round trip times could vary significantly. For example in 3G networks, the round trip time could vary from 100 to 200 milliseconds in good conditions, and much larger (order of seconds) in poor wireless conditions. Thus the delay that user would see before the first page is displayed could be 300 to 600 milliseconds in best conditions.

Because of the long and unpredictable delays associated with wireless networks, especially 3G networks, it would be beneficial if there were a system and method that could reduce the number of required roundtrips between the user and the remote servers.

SUMMARY OF THE INVENTION

The problems of the prior art are alleviated by the present invention. The present invention discloses the collection of user input independent of an application activation and the subsequent forwarding of that input to the network along with the underlying partially filled protocol packets, such as DNS Request, TCP-SYN data, local browser parameters, and application-data packets. An Enhanced Server side application, for example an enhanced DNS server, receives the multi-part message, processes its portion of the message, and delivers the remaining message to subsequent servers. In alternative deployment environments, such as a proxy, the proxy receives the entire data for multiple applications and completes the above steps on behalf of the client application, thus minimizing the round trips between the original client and the server.

The present invention further extends the above multi-part message on the client side, to include additional application data, for example, "yellow pages", "restaurants" that are processed at the target web site such as yahoo. The client side gathers the user input, and sends toward the network (server). The target server processes the received input for returning more optimal web-page content to the client, thus minimizing the interactive steps (and associated round-trips) for presenting the relevant content to the user.

An additional part of the invention includes the client device adding location information when available and relevant along with the user entered input in the multi-part message. The location information enables the server to further determine the appropriate content relative to user input, thus minimizing the interactive steps for determining the correct page of interest.

It should be noted that while the descriptions and operational examples below combine DNS Resolution, TCP-Connection establishment, and HTTP Request/Response etc., to reduce round-trips from 3 to 1, the methods are equally applicable for combining portions of the steps as well. For example DNS resolution and TCP Connection Establishment could be combined as one step, leaving HTTP Request/Response as $2^{nd}$ step, thus reducing the total number of steps from 3 to 2. Similarly, TCP Connection establishment may be combined with sending HTTP Request step. Other combinations are also possible and are within the scope of the invention.

Another aspect of the current invention relates to gathering user input relative to launching of an application. For starting an application, the steps used in the state of the art include: the user selects an application first, the application presents one or more selection windows, user selects one window, then the input stream is attached to the selected application window. Alternatively in other operating system (OS) environments, an OS component, such as shell, matches the first input keyword to application names (by matching strings, or file-types to applications) and activates the application. The current invention proposes a post-fix order of entering input in which user enters parameters first and then selects one or more applications to process the parameters. The parameters are processed by one more local or remote applications.

Another aspect of the current invention is to obtain additional parameters regarding the client device in addition to the user entered input. Examples of such parameters include, user's approximate location, time of day, or user profile, and forward along with the user entered input towards the targeted remote server.

BRIEF DESCRIPTION OF THE DRAWINGS

In order to facilitate a fuller understanding of the present disclosure, reference is now made to the accompanying drawings, in which like features are referenced with like numerals. These figures should not be construed as limiting the present disclosure, but are intended to be exemplary only.

FIG. 1 is a representative mobile wireless network;
FIG. 2 is a protocol sequence as performed in the prior art;
FIG. 3 represents a first embodiment;
FIG. 4*a* is a first protocol sequence in accordance with a first embodiment;

FIG. 4*b* is a second protocol sequence in accordance with a first embodiment;
FIG. 5 represents a second embodiment;
FIG. 6 is a protocol sequence in accordance with a second embodiment; and
FIG. 7 shows the sequence that the client side software uses to determine the contents of the multi-part message.

DETAILED DESCRIPTION OF THE INVENTION

FIG. 3 shows a first embodiment of the present invention and represents an example network configuration having one or more devices that contain the enhancements described in the present invention. Those components described in conjunction with FIG. 1 have the same function, unless otherwise noted. This embodiment does not utilize an inline proxy. In this embodiment, the user equipment (UE) contains an Application Launch Environment (ALE), which will be described in more detail later. Briefly, the ALE enables a reduction in round trips by accepting information that is typically contained in multiple messages at once. The device or software that contains this functionality is referred to as the "ALE server" for purposes of this disclosure. An ALE server may be a separate hardware component with associated software in certain embodiments. In other embodiments, the ALE server is simply specialized software that resides on a pre-existing component in the network. FIG. 3 also identifies several possible locations for an ALE server, including the DNS server, the application server and the CDN/Cache. In conjunction with the ALE server is a client-side application, preferably located on the user equipment. The user device in the following examples is preferably a smart mobile phone, or a laptop with mobile wireless access card.

The sequence of operations using the current invention in this embodiment is shown in FIGS. 4*a* and 4*b*.

As described above, in prior-art environments, the user activates an application, and then enters input to application window. In the present invention, the input is gathered without the context of an application to facilitate overlap between parsing input and activating application. The input collection and parsing could be done by an OS Component (such as command line shell) or a new application client termed Application Launch Environment (ALE) in the current invention. The operation of the ALE is described in more detail below.

In the present invention, the user may enter "yahoo", "yp" and selects browser application. The ALE Client (or an OS Component) gathers this user input, and translates "yahoo" as www.yahoo.com, and "yp" as yellow-pages on the yahoo website. This translation can be performed by referring the recent browsing history to find a website that includes the same words, keywords or sequence of letters. Alternatively, frequently used websites and abbreviations can be bookmarked by the device and can be referenced to determine whether the inputted text is a previously bookmarked site.

While the above description details an embodiment in which the client side (ALE Client) performs the translation of user input to application data based on history and other mechanisms, in an alternate embodiment, the client side could also pass portion of the data, for example "yp" to the server side (for example, the server at www.yahoo.com), and the server may perform the translation. Thus, the client side determines the target processing entity, and passes portions of user input in the multi-part message. In other applications, the client supplies non-abbreviated input, such as "www.yahoo.com yellow pages ie7".

In this example, since a Web browser application is selected, the ALE Client recognizes that the complete transaction requires DNS Resolution, TCP Connection, HTTP Request, and sending additional application data (as shown in FIG. 2). Based on this knowledge, the ALE client may construct a multi-part message that includes one or more of the following:
  (a) DNS Request, local UDP Port Number for receiving the DNS Response,
  (b) TCP SYN (with local TCP data), local TCP Port Number,
  (c) http-request with known browser parameters,
  (d) application data, such as the webpage desired, i.e. "yellow-pages", and
  (e) optionally, locally available information depending the type of client device. Example parameters may include, but are not limited to,
    a. Geographical coordinates if the mobile device has GPS capabilities or approximate location of the BTS that the mobile device registers with,
    b. Time of day, and
    c. User profile.

This concatenation of information is then forwarded as shown in step 2 of FIGS. 4a and 4b. The recipient of this information may be an Enhanced DNS server (which is a traditional DNS server with software enhancements for multi-part message) or a new server application, termed ALE server, in the current invention. The ALE server is a logical entity that may be located in the DNS server, the application servers, or in a Proxy device, and contains the software necessary to implement these features.

In step 3, the Enhanced DNS server or ALE Server receives the multipart message, resolves the DNS Name to a host-address, and as shown in step 3a of FIG. 4a, sends a DNS Response to the original client. In step 4, the Enhanced DNS server or ALE server forwards the remaining multi-part message to the resolved host-address.

In step 5, the Server at the host-address receives the TCP Connect data (TCP SYN), Browser Parameters, and application data. The server may be enhanced with software that allows processing multi-part message or incorporate an ALE Server that communicates with local servers. In one embodiment, the server returns TCP-SYN-ACK to the original client and passes the browser parameters and application data to the http-server.

In step 6, the http server subsequently returns the HTTP response over the connection established in step 5. Thus, while the original client request is a multi-part/multi-application message, each application may return its own response to the original client. In this embodiment, a DNS response was delivered by the DNS server, a TCP/SYN-ACK was returned by the server at the host-address, and a HTTP response was returned by the http server. This three separate response emulate the 3 responses shown in FIG. 2 in steps 3, 5 and 9.

In an alternative embodiment, shown in FIG. 4b, the responses from the server side (i.e. the DNS Response, the TCP/SYN-ACK, and the HTTP response) are combined as a multi-part message and sent to the original client, as shown in step 6 of FIG. 4b. With this alternative, the Enhanced-DNS server resolves DNS Name to a host-address, and forwards the DNS Response along with the rest of the multi-part message to the resolved host-address, as shown in step 4. The server at the host-Address processes the TCP-SYN data, constructs TCP/SYN-ACK, forwards the browser parameters and application data to the Application Server. The application server then constructs a multi-part message that includes DNS Response, TCP/SYN-ACK, and HTTP Response and forwards to the original Client (Browser) in step 6.

It should be noted while the embodiment of FIG. 4b combines responses as a multi-part message, round trip reductions are also achieved in the earlier embodiment of FIG. 4a as well where the responses are returned by the corresponding server side applications directly to the client. This reduction is based on the fact that these responses are sent to the client without requiring additional interactions with client. Thus, each response is sent by the server as soon as practical without waiting for any additional communication or interaction with the client.

In a further embodiment, additional parameters can be generated by the ALE client and passed to the ALE server. For example, assume that the user input is "yahoo yp pizza ie", for which ALE client generates a multipart message. The ALE client may also pass additional client related parameters in the message. For example, in the above message, the location of the client may provide useful information, since it is likely that the user is looking for the phone number of a pizza store nearby. In this case, an additional parameter, such as "GPS coordinates", may also be passed. In another embodiment, the store may be closed on certain days, or have limited hours. Thus, including both "GPS coordinated" and "time of day" may be useful parameters to pass to the ALE server. Other parameters specific to the user device may also be passed as appropriate.

The embodiment shown in FIGS. 3 and 4 assumes that additional software functionality (ALE) is incorporated in various components in the network. In an alternative embodiment, an inline proxy is incorporated which incorporates the functionality of the ALE server. Specifically, the proxy has the software required to implement the sequences described below.

FIG. 5 shows a second embodiment and represents a network configuration and alternative locations for the Inline Proxy. For example, in the 3G/UMTS Network, the alternative locations include: (1) IuPS interface between the RNC and SGSN, (2) Gn interface between the SGSN and GGSN, or (3) Gi interface north of GGSN between GGSN and Internet. The proxy is preferably located such that all communications to the application, DNS and http servers is via a wireline network.

FIG. 6 shows the protocol sequence when used with an inline proxy. First, as in all previous example, the User enters "yahoo", "yp" and selects browser application in step 1.

Similar to the previous example, the ALE Client gathers user input, and translates yahoo as www.yahoo.com, and "yp" as yellow-pages on yahoo site. As before, this translation can be performed by referring the recent browsing history to find a website that includes the same words, keywords or sequence of letters. Alternatively, frequently used websites and abbreviations can be bookmarked by the device and can be referenced to determine whether the inputted text is a previously bookmarked site.

As described above, since a Web-browser is selected, the client-device (via the OS or software application) recognizes that it requires DNS Req, and TCP Connection. It constructs a multi-part message that includes one or more of the following components:
  (a) DNS Request along with local UDP Port Number for receiving UDP Response,
  (b) TCP SYN (with known client data) along with local TCP Port number,
  (c) http-request with known browser parameters,
  (d) application data, such as "yellow-pages", and
  (e) optionally, locally available information depending the type of client device. Example parameters include, but are not limited to:

a. Geographical coordinates if the mobile device has GPS capabilities or approximate location of the BTS that the mobile device registers with,
b. Time of day, and
c. User profile.

This multi-part message is then forwarded to the proxy device, as shown in step 2.

The proxy supports Split-TCP operation, and can therefore maintain a separate TCP connection to client, and a different TCP connection to the server, and does packet forwarding between the two connections.

The proxy forwards the DNS Query to the default DNS server (as shown in step 6). At the same time, it generates DNS Response (with its own host-Address) to the client, as shown in step 3, and a TCP/SYN-ACK to the client, as shown in step 4. The proxy buffers the application data locally. It should be noted that the proxy has the option of returning DNS Response & TCP/SYN-ACK as separate responses, as shown in steps 3 and 4 or as a single message response. Both embodiments do not require additional round-trips with the client.

The proxy receives the DNS Response from target server in step 7, and initiates TCP connection to host-address contained in the DNS Response, as shown in step 8.

After the TCP connection is established to application server, the proxy sends the application data buffered to the application server (HTTP Server) in step 11.

The application server returns the HTTP Response to the Proxy in step 12, and the proxy forwards the response to the client in step 14.

The above description shows the in-line Proxy device between the Wireless network and Wireline network serving as an anchor point for the ALE Server. Thus it is terminating the multi-part message and using the standard protocols between the Proxy and home servers (DNS, Yahoo etc.). Thus the example uses the methods described in this disclosure over the wireless network to reduce round-trips, but uses prior art mechanisms in the wireline network. Thus the intent is to minimize the roundtrips over the Radio Access Network where the round trip times are large.

In other words, there are a large number of round trips in the protocol shown in FIG. 6. However, the number of round trips that occur over the wireless network has been minimized, as this is the main source of latency in the communications path. This embodiment has the further advantage that a minimal amount of change is affected in this embodiment. For example, the client and the proxy need to have the enhanced ALE functionality. However, the DNS, application server, and http server operate in accordance with prior art protocols, thereby minimizes changes to the overall network and speeding the adoption of this new technique.

In another embodiment, the methods outlined above could be further enhanced through the use of multi-packets on the wireline network, as shown in FIG. 4b. The methods outlined in the current invention could be used on the wireline network as well by forwarding the multi-part message on the wireline network as in the previous example.

While the above examples all show the client sending a single message containing DNS, TCP and application data, it should be understood that the client may compose a multi-part message comprising less than all of the required data. For example, the client may send a first message having DNS and TCP information, and a subsequent message having application data. The present invention simply requires that the target concatenate the information into fewer messages than are traditionally delivered.

Having described the placement of the ALE devices as well as the various protocols that can be used, the function of the ALE module will be described in more detail. In the Local Application-launching environment (ALE), two aspects will be described, namely, 1) the gathering user input, and 2) the generation of the multi-layer packet.

Conventionally, when a user enters input, it is parsed by a software component. For example, if the input is written in an active application window, that software application parses the input. In the case of command line input, the Operating System, such as unix or linux, collects the input and determines how to process it. One such example is described below.

As the user enters xyztest1.bat, only after .bat and CR are entered, the OS recognizes that this is a .bat file, searches for the file in the path, and activates the batch processor. In the current invention, the gathering of the input, parsing etc. could be done in a similar way by the OS-environment, or by new application termed, "Application Launch Environment (ALE) Client", that is somewhat similar but smarter than a batch processor.

An ALE Client works by gathering the input and determining the most efficient way to transmit requests and/or data to other nodes. For example, if the input is "ie7 yahoo yp Marlboro restaurants", the present invention executes the following steps, as shown in FIG. 7.

First, the client translates "yahoo" to "www.yahoo.com" (based on history or another algorithm), based on the knowledge that the application is a browser (in this case Internet Explorer 7), as shown in Box 700.

The ALE client then translates "yp" to "yellow pages", as shown in Box 710, based on the knowledge and history that the application is browser, and target is yahoo-server. Alternatively, ALE Client recognizes that the data is for the target server at www.yahoo.com and passes the raw-data. In another alternative, the ALE client passes user input that it has not associated with a processing step or application as "un-associated data" in the multi-part message, and subsequent servers parse the un-associated data, as their association becomes clear.

The ALE client recognizes that for a website access, a DNS-query needs to be sent to a DNS server, as shown in Box 720. The ALE client also recognizes that a TCP connect needs to be sent to the address identified by the DNS server, although that address is not yet known, as shown in step 730.

Finally, the ALE client recognizes that a http request needs to be sent to the application server with the local browser parameters, as shown in Box 740.

In the prior art implementation, for example, in a browser application, the above steps are performed sequentially, by the application sending the corresponding protocol packet and waiting for response before proceeding to the next step, as shown in FIG. 2.

In the current invention, these steps are look-ahead processing steps by the ALE software application. When it processes the input string, it understands the above steps. So, in Box 720, it constructs a DNS Query packet with www.yahoo.com, and the local UDP Port number for receiving response. In Box 730, it constructs a TCP-SYN packet (with the missing remote IP address which is to be returned by the DNS server), and local TCP Port number. In Box 740, the ALE client constructs a http request with the local browser parameters, without knowledge of the DNS or TCP data. The ALE Client then combines these 3 packets as a multi-segmented packet, with each segment containing TLV parameters (Type, Length, Value). In another embodiment, a fourth parameter is appended to each segment, which defines the target protocol (or application), so this would be PTLV list. The ALE sends this request to a DNS Server that has extensions to support this multi-part message. Additional DNS Server Extensions are defined to enable this functionality. Alternatively, a new application type, termed, "ALE Server" in the present invention resides in the DNS server or other places, for example in the inline proxy. The multi-part message would be sent to the ALE Server. The ALE Server peels off its processing step, and hands over the remaining steps to the next ALE Server (or corresponding application server). So for the above 5 steps, the PTLV may be constructed as a message having 3 or more separate PTLV segments, as shown below:

(1) DNS, dns-data-type, length, "www.yahoo.com", (2) TCP, connect-data-type, length, "connect params", (3) HTTP, http-request-data-type, length, browser-parameter-data, (4) optional location information-data-type, length, location data, (5) optional time of day information-data-type, length, time of day data.

While the above example shows the steps and messages that are created when a webpage is to be accessed, the same methodology can be utilized for other applications as well. For example, file transfers from remote servers, or the retrieval or sending of email may also be performed using the present invention.

Another application is the user of a virtual private network (VPN). Assume a user is accessing an enterprise network through a VPN and is downloading a file. In this example, the ALE client software collects user input such as file name, the target directory/path if applicable, and the application name such as FTP, PPT and constructs a multi-part message and forwards it towards the ALE Server located in the enterprise network. The ALE client software then simultaneously starts local applications and client protocol entities to receive responses for multi-part message. Upon receipt, the ALE server software parses the multipart message and forwards it to the corresponding receivers as in the previous example.

Another consideration is the method in which the user data is collected and processed. In the mobile handset environment, to start a voice call, the user enters the desired phone number, and then clicks the "call" button. This is termed "Post-fix Application launch" in the present invention, since the application data is entered before the application is activated. Thus, the voice application when activated uses the previously entered input as parameters.

However for web-browsing applications, in the prior art, the user launches the web browser, which presents an input window, and the OS-environment ties the keyboard input to the browser's input window. In other OS and browser environments, the user needs to point to the browser input window (tool bar for example) and then type the input. After entering the input, for example www.yahoo.com, if the user would like to use a different browser, for example, FireFox instead of Internet Explorer, the user has to launch the new application, and then re-enter the input. While mechanisms such as cut & paste and other keyboard/pointing device operations attempt to reduce user clicks, they are cumbersome on a mobile handset device. The present invention also defines a post-fix type of application activation similar to voice call activation.

In the post-fix application activation method in the present invention, OS components such as shell, or input driver, or a new software application (part of the ALE Client) collects input that is not associated with any application. The "ALE Client" buffers user input and passes it on to an application when activated, similar to placing a voice call. ALE client software processes the buffered input and establishes context based on selected application, auto-completion, and actions required for the application launch. For example if the user input is "yahoo" and application activated is browser, the ALE Client software determines DNS Look up, TCP Connection, and HTTP-REQUEST are required. Alternatively ALE Client software passes the buffered input to the activated application, which parses the input and determines required steps such as DNS Lookup, TCP Connection and HTTP request etc. This latter approach requires the application (for example, the web browser) to process the steps in parallel without issuing each request and waiting for response before proceeding to the next step.

The post-fix method described above facilitates passing the same input for multiple applications, by the input processor preserving the previously entered un-associated input and passing on to the next application launched.

The post-fix launching method defined in the present invention facilitates sending the same set of application parameters to alternative destinations (without user entering or activating the applications first and then entering parameters for each application) or sending the same parameters, and different local applications to the same destination. For example, the command:

Yahoo, yellow-pages, restaurants, (IE7, FireFox)

could result in generating two multi-part messages, the first packet with IE7 browser parameters, and the second packet with FireFox parameters, and the home server (or proxy) establishing two connections to the client, thus reducing serial steps that a user would have to take in achieving the same goal with different target-servers or client applications.

All applications and software described herein are computer executable instructions that are contained on a computer-readable media. For example, the software and applications may be stored in a read only memory, a rewritable memory, or within an embedded processing unit. The particular computer on which this software executes is application dependent and not limited by the present invention.

What is claimed is:

1. A method for reducing round-trip communication over a network between a client and one or more remote servers, comprising:
    a. providing a client-side software application for collecting input from user, said input selected from the group consisting of software application identification, software application parameters, and remote server information.
    b. using said Client-side software application to analyze said user input, to determine a set of required protocol and application steps including a DNS request, to construct a multi-part message based on said user input, wherein said multi-part message comprises a single message which includes portions associated with multiple protocols and/or applications, and to receive responses from said one or more remote servers;
    c. sending said multi-part message toward a network device that supports receiving such multi-part messages;
    d. using said network device to receive said multi-part message, to identify said DNS Request portion of said multi-part message, to resolve the domain names to the address of an application server, and remove said DNS Request from said multi-part message;
    e. using said network device to forward the remaining portion of said multi-part message toward said application server;
    f. using said application server to receive said remaining portion of said multipart message, to identify a network protocol portion of the message, to complete a protocol handshake with said client device; and g. using said application server to decode a portion of said multi-part message that includes application parameters, and sending an application response to said client over a network connection established in step f.

2. The method of claim 1, wherein said protocol handshake and said application response are sent to said client in a multi-part response message.

3. The method of claim 1, wherein said network device performs the following steps after receipt of said multi-part message:
   a. recognizing a portion of said multi-part message that it supports;
   b. determining parameters for said portion;
   c. filling in other portions of said multi-part message with said determined parameters; and
   d. forwarding said multi-part message toward an application server.

4. The method of claim 3, wherein said network is a DNS server, said determined parameter comprises the IP address of said application server, and said network devices fills in said IP address into a network protocol portion of said multi-part message.

5. The method of claim 3, wherein said application server receives the remaining portion of the multi-part message forwarded by said network device, and completes processing said remaining portion of multi-part message.

6. The method of claim 5, wherein said processing of said remaining portion of said multi-part message comprises establishing transport layer connection with said client, and handing over the application request to the application server.

7. The method of claim 3, wherein a second network device receives said forwarded multi-part message, and after receipt of said multi-part message, performs the following steps:
   a. processing a portion of said message;
   b. removing said processed portion of said message;
   c. filling in a portion of remaining message from the processing completed; and
   d. forwarding said remaining message toward said application server.

8. The method of claim 1, wherein said client-side software application receives user input, and determines the associated applications in said client device, and the corresponding network protocols for completing the user request.

9. The method of claim 1, wherein said network device receives responses for each portion of the received multi-part message, constructs a multi-part response message and sends said response to said client.

10. The method of claim 1, wherein said network device sends a DNS response to said client after identifying said DNS Request portion of said multi-part message, and resolving said domain names to the address of an application server.

11. A method of reducing round-trip communication through the internet between a client and one or more remote servers, comprising:
   a. using a software application in a client device to construct a multi-part message, said multi-part message comprising a single message which comprises:
      application and network protocol portions derived from input received from a user of said client device, wherein said network protocol portion comprises DNS Request, TCP SYN Request and or UDP/Application data, and other network/transport protocol information, and said application portion comprises corresponding application information, and wherein said protocol and application portions comprise only local information available in said client device, and wherein information not available in said client is marked as such so as to be filled by said one or more remote servers; and
   b. sending said multi-part message toward said one or more remote servers.

12. The method of claim 11, further comprising:
   a. Using said software application in the client device to identify and launch local applications and network protocol entities, to receive and process responses from the multi-part message.

13. The method of claim 11, wherein said application portion comprises information selected from the group consisting of locally known geographical location information, sector, cell or region information known to the client device in a cellular network environment, and time of day information.

14. The method of claim 11, wherein said corresponding application information comprises a http request.

15. The method of claim 11, wherein said information not available in said client comprises an IP address.

16. A method for reducing round-trip communication over a network between a client and one or more remote servers, comprising:
   a. providing a client-side software application for collecting input from user, said input selected from the group consisting of software application identification, software application parameters, and remote server information.
   b. using said Client-side software application to analyze said user input, to determine a set of required protocol and application steps including a DNS request, to construct a multi-part message based on said user input, wherein said multi-part message comprises a single message which includes portions associated with multiple protocols and/or applications, and to receive responses from said one or more remote servers;
   c. sending said multi-part message toward a proxy device that supports receiving such multi-part messages; and
   d. locating said proxy device in the path between said client and said remote servers, wherein said proxy performs the following steps:
      i. identifying a portion of the said multi-part message;
      ii. performing a proxy operation for that portion of the message by constructing a corresponding standard message using the information from the said portion;
      iii. forwarding said standard message to a relevant server;
      iv. receiving a response from said relevant server;
      v. and returning a response to the original server.

17. The method of claim 16, wherein said proxy device further performs the following steps:
   a. filling appropriate portions of said multi-part message with said response received from said relevant server;
   b. processing the next part of said multi-part message, by
      i. performing a proxy operation for said next part of said multi-part message by constructing a second corresponding standard message using the information from said filled portion;
      ii. forwarding said second standard message to a second relevant server;
      iii. receiving a response from said second relevant server;
      iv. and returning a second response to the original server.

18. The method of claim 16, wherein said proxy device utilizes standard messages when communicating with said remote servers.

19. The method of claim 16, wherein said proxy is located in the Radio Access Network for reducing the round trips in the wireless network.

20. The method of claim 16, wherein said proxy is located in the Public Land Mobile Network (PLMN).

21. The method of claim 20, wherein said proxy is located between the GGSN and the internet.

22. The method of claim 16, wherein said proxy gathers responses for each portion of said received multi-part message, constructs a multi-part response message and sends said response to said client.

23. A method of dissociating user input and application launching comprising:
   a. executing, on a computer, a software application for gathering user input independent of application activation or launching; wherein said software application:
      i. accepts the user input in which the application parameters, protocol type, and application name, are provided by said user; and
      ii. generates a multi-part message; wherein said multi-part message comprises a single message which comprises identifiable portions, where each portion contains unique identification of which application or protocol should process that portion, and the corresponding local protocol parameters and options.

24. The method of claim 23, wherein said application allows the user to specify a plurality of applications, protocols, or targets.

25. The method of claim 23, wherein said application receives said user input in post-fix format.

* * * * *